April 19, 1938.    T. S. RILEY    2,114,318
EDGE ROUNDING MACHINE
Filed Aug. 24, 1936
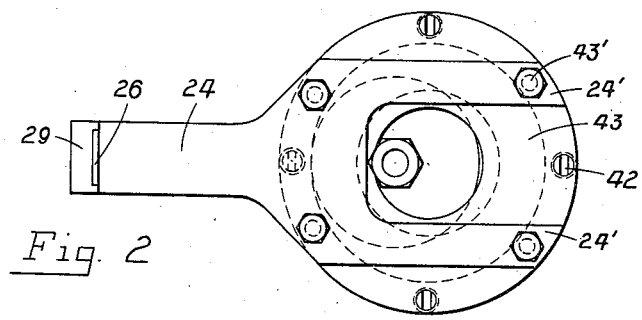
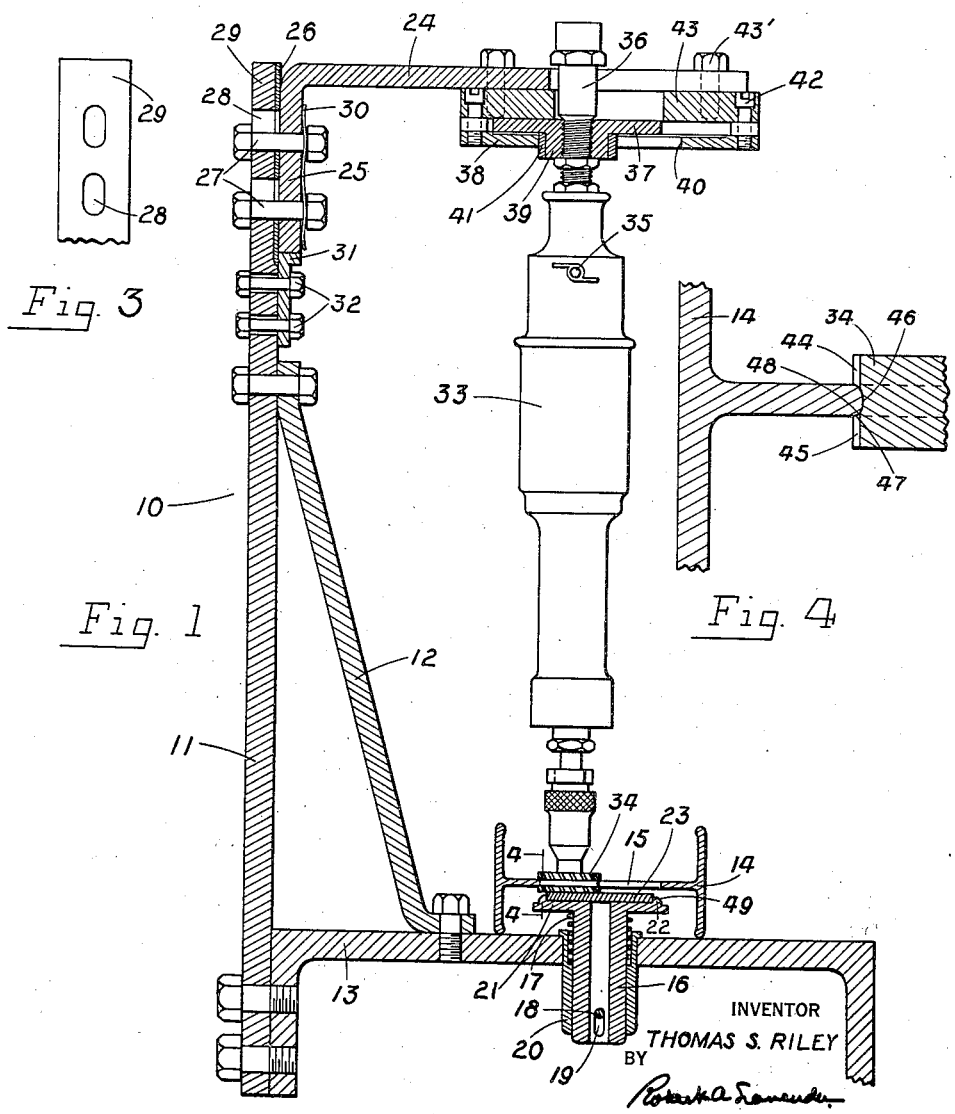
INVENTOR
THOMAS S. RILEY
BY
ATTORNEY Patented Apr. 19, 1938

2,114,318

UNITED STATES PATENT OFFICE 2,114,318

EDGE ROUNDING MACHINE

Thomas S. Riley, Philadelphia, Pa.

Application August 24, 1936, Serial No. 97,601

5 Claims. (Cl. 90—13.1)

(Granted under the act of March 3, 1883, as amended April 30, 1928; 370 O. G. 757)

This invention relates to an edge rounding machine and has for an object to provide a device for rounding the edges of structural parts, particularly structural parts used in aircraft.

In the manufacturing of structural parts for aircraft, weight is an important factor. In order to lighten structural parts such as I-beams, H-beams, T-beams, channel bars, etc., it is customary to punch holes therein whenever the same may be done without impairing their strength. The bars and beams themselves are generally manufactured by shearing and punching them from larger pieces of material. It is a well known fact that when such parts are sheared or blanked or when holes are punched, microscopic cracks are left surrounding the holes or sheared edges. The material at these cracks, when subjected to strains and fatigue is more than likely to become weakened, not only causing damage to other members of the structure by placing undue strain thereon, but by possibly causing a complete failure of the part with the possibility of serious accident.

It is an object of this invention to provide a device for machining radially the lightening holes or along shearing edges in structural parts, such as wing beams or spars, and is applicable to either round or irregular shaped holes that have been punched. The device may be powered either by electricity or compressed air and may be used with any gauge thickness of material worked by judicious selection of appropriate sized cutters.

With the foregoing and other objects in view, the invention consists in the construction, combination and arrangement of parts, as will be described more fully hereafter.

In the drawing:

Fig. 1 is a partly sectional and partly elevational view of the invention in operation;

Fig. 2 is a top plan view of Fig. 1;

Fig. 3 is a side view of a fragment of the supporting standard, and

Fig. 4 is an enlarged detail view on line 4—4 of Fig. 1, showing the cutter in operative position on the hole of an H-beam.

The edge rounding machine of this invention as shown at 10 includes a standard 11 reinforced by a brace 12 secured to a bench 13 on which the piece of work, as an H-beam 14, is placed. The H-beam 14, as shown, has been provided with lightening holes 15 that have been punched out in the customary manner. Extending through the bench 13 is a locating plunger 16 urged yieldably upwardly by means of springs 17 and held by pin 18 and slot 19 within the cylinder 20. The plunger 16 is provided with a head 21 having an upstanding flange 22 providing a pocket for the reception of a disc 23 freely rotatable therein. The outer upper edge of the flange 22 is beveled as at 49, and the outer diameter of the flange 22 is equal to the diameter of the punched hole 15 which is to be machined. The spring 17 normally urges the plunger 16 upwardly so as to cause the flange 22 of the head 21 to locate the hole 15 of the work 14 in proper position for machining.

A bifurcated arm 24 extending from a depending leg 25 is supported for slidable vertical movement against a sliding key 26 by means of bolts and nuts 27 passing through vertically extending slots 28 in the upper end 29 of the standard 11, a friction leaf spring 30 being located between the heads of nuts and bolts 27 and the leg 25. A stop 31 is held for limited adjustment by means of bolts and nuts 32 extending through the standard 11, and serves to limit the downward movement of the leg 25.

Supported from the bifurcations 24' of the arm 24 is the cutter head 33 which carries the cutter 34. The cutter head 33 may be an air drill, in which case the actuating valve is located at 35, although if operated by electricity, the control switch would preferably be located in the same position. A supporting stem 36 extends through a supporting disc 37 which is T-shaped in cross-section. The T-head thereof rests on the upper surface of a cam plate 38, and the T-stem 39 of the T disc 37 extends through the opening 40 in the cam plate 38, and is provided with bushing 41 to ride against the sides of the opening 40 in the cam plate 38. The cam plate 38 is supported by studs 42 extending therein from a ring 43, which in turn is supported by studs 43' extending through the bifurcations 24' of the arm 24.

The cutter 34 as shown in the enlarged view in Fig. 4, is provided with a series of drill teeth 44 and 45, the series 44 being separated from the series 45 by a recessed groove 46 having no cutting edge at its apex, but providing cutting edges as at 47, where the groove merges to the top of the teeth 44 and 45. It is these cutting edges 47 that serve to machine the edge 48 of the punched hole 15 in the work 14, the distance between the adjacent upper edges of the teeth 44 and 45 being equal to the gauge of the work.

In operation, the work 14 is placed on the bench 13 with the punch hole 15 located over the plunger 16, and is moved thereover until the plunger 16 can enter the punch hole 15. The cutter head 33 is then grasped firmly by the operator and pulled downwardly until the lower end of the leg 25 abuts the stop 31, the plunger 16 meantime moving downwardly out of the hole and allowing the cutter 34 to enter the punch hole 15. The cutter is then set in operation by actuating the control 35 and the operator moves the cutter head over to one side until the cutter teeth 47 abut against the edge 48 and bushing 41 on the T-stem 39 of the T-disc 37 abuts against the side of the cam hole 40 in the cam plate 38, thus limiting the movement of the cutter head 33. The cutter head 33 is then operated along the path of the cam hole 40 until it has made a complete revolution, it being observed that the shape of the cam hole 40 is identical with the desired shape of the punch hole 15, whether the same be regular or irregular.

After a complete revolution has been made, the cutter 34 is pulled back toward the center of the hole and a slight upward thrust clears the work, permitting the beam to be pushed forwardly until the next hole is over the locating plunger 16.

Other modifications and changes in the proportions and arrangements of the parts may be made by those skilled in the art without departing from the nature and scope of the invention, as defined in the appended claims.

The invention described herein may be manufactured and used by or for the Government of the United States of America for governmental purposes without the payment of any royalties thereon or therefor.

Having thus set forth and disclosed the nature of this invention, what is claimed is:

1. An edge rounding machine, comprising a cutter head, an edge cutter operable by said cutter head, cam means for supporting said cutter head for horizontal movement, means for supporting said cam means and cutter head for limited vertical movement, and a work locating plunger yieldably urged against the bottom of said edge cutter, said edge cutter being provided with a groove having its apex free of cutting teeth.

2. An edge rounding machine, comprising a cutter head, an edge cutter operable by said cutter head, cam means for supporting said cutter head for horizontal movement, means for supporting said cam means and cutter head for limited vertical movement, and a work locating plunger yieldably urged against the bottom of said edge cutter, said edge cutter being provided with a groove having its apex free of cutting teeth, said supporting means comprising a standard, a bench, said locating plunger being supported in said bench, said locating plunger being provided with a head adapted to enter the punch hole in the work to properly locate the same, said cutter forcing said plunger head out of said hole as it is moved downwardly to operative position.

3. An edge rounding machine, comprising a bench, a supporting standard on said bench, a supporting arm adjustably secured on said supporting standard, a cutter head depending from said supporting arm, means on said supporting arm providing guide horizontal movement for said drill, a cutter operable by said cutter head, and a work supporting plunger in said bench yieldably urged against the bottom of said cutter.

4. An edge rounding machine, comprising a bench, a supporting standard on said bench, a supporting arm adjustably secured on said supporting standard, a cutter head depending from said supporting arm, means on said supporting arm providing guide horizontal movement for said cutter head, a cutter operable by said cutter head, and a work supporting plunger in said bench yieldably urged against the bottom of said cutter, said arm being secured to said support for vertical adjustment thereto, and stop means adjustably limiting the downward movement of said arm relative to said standard.

5. An edge rounding machine, comprising a cutter head, an edge cutter operable by said cutter head, cam means for supporting said cutter head for horizontal movement, means for supporting said cam means and cutter head for limited vertical movement, and a work locating plunger yieldably urged against the bottom of said edge cutter, said supporting means comprising a standard, a bench, said locating plunger being supported in said bench, said locating plunger being provided with a head adapted to enter the punch hole in the work to properly locate the same, said cutter forcing said plunger head out of said hole as it is moved downwardly to operative position.

THOMAS S. RILEY.